United States Patent
Kondo et al.

(10) Patent No.: US 8,330,863 B2
(45) Date of Patent: Dec. 11, 2012

(54) INFORMATION PRESENTATION APPARATUS AND INFORMATION PRESENTATION METHOD THAT DISPLAY SUBTITLES TOGETHER WITH VIDEO

(75) Inventors: Tetsujiro Kondo, Tokyo (JP); Kazutaka Uchida, Tokyo (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 12/417,812

(22) Filed: Apr. 3, 2009

(65) Prior Publication Data

US 2009/0256959 A1    Oct. 15, 2009

(30) Foreign Application Priority Data

Apr. 7, 2008    (JP) ................................. 2008-099566

(51) Int. Cl.
*H04N 5/445*    (2006.01)

(52) U.S. Cl. ......... 348/564; 348/563; 348/565; 348/468

(58) Field of Classification Search .................. 348/564, 348/563, 565, 465, 468, 461; 725/40, 43
See application file for complete search history.

(56) References Cited

U.S. PATENT DOCUMENTS

| | | | | |
|---|---|---|---|---|
| 5,978,046 A * | 11/1999 | Shintani | ........................ | 348/589 |
| 6,088,064 A * | 7/2000 | Rumreich et al. | ............ | 348/564 |
| 6,833,874 B2 * | 12/2004 | Ozaki et al. | ................... | 348/565 |
| 2007/0002179 A1 | 1/2007 | Naka | | |

FOREIGN PATENT DOCUMENTS

JP    2007-13725    1/2007

OTHER PUBLICATIONS

U.S. Appl. No. 12/479,198, filed Jun. 5, 2009, Kondo, et al.

* cited by examiner

*Primary Examiner* — Jefferey Harold
*Assistant Examiner* — Jean W Desir
(74) *Attorney, Agent, or Firm* — Oblon, Spivak, McClelland, Maier & Neustadt, L.L.P.

(57) ABSTRACT

An information presentation apparatus including a video signal inputting unit, a first image generating unit, a second image generating unit, and an image combining unit is provided. A video signal is inputted to the video signal inputting unit. The first image generating unit is configured to generate an image using the video signal inputted from the video signal inputting unit. The second image generating unit is configured to generate a small image with a display size smaller than a display size of the image generated by the first image generating unit. The image combining unit is configured to combine the small image generated by the second image generating unit with the image generated by the first image generating unit by placing the small image at a predetermined display position in a subtitle display area where a subtitle image is displayed within the image generated by the first image generating unit.

17 Claims, 18 Drawing Sheets

| SUBTITLES No. | DISPLAY START TIME Ts | DISPLAY END TIME Te | SUBTITLE CONTENT |
|---|---|---|---|
| 0 | 1.2 SECONDS | 5.5 SECONDS | This is the Lunchtime News… |
| 1 | 7.3 SECONDS | 12.1 SECONDS | This morning, in Chiba… |
| 2 | 13.0 SECONDS | 18.0 SECONDS | A man wielding a knife… |
| 3 | 20.4 SECONDS | 25.0 SECONDS | According to witnesses… |
| ⋮ | ⋮ | ⋮ | ⋮ |

| TOPIC NAME | ICON |
|---|---|
| NEWS | 📄 |
| BASEBALL | 🏟 |
| MUSIC | ♪ |
| ⋮ | ⋮ | stration
INFORMATION PRESENTATION APPARATUS AND INFORMATION PRESENTATION METHOD THAT DISPLAY SUBTITLES TOGETHER WITH VIDEO

BACKGROUND OF THE INVENTION

1. Field of the Invention

The present invention relates to an information presentation apparatus and an information presentation method, and in particular to an information presentation apparatus and an information presentation method that display subtitles together with video.

2. Description of the Related Art

In the past, audio information has been presented as text together with the display of images during television broadcasts and the like. Such text is referred to as "subtitles" or "captions", and plays a role in aiding viewers' understanding of image-based media content.

However, there has been the problem that when a viewer is concentrating on reading subtitles, the viewer's attention is diverted from other information aside from the subtitles, such as video information. In such case, even if the viewer can understand the information being presented as subtitles, the viewer may not be able to understand the other information expressed by video or the like.

Even when the viewer is not concentrating so hard to read the subtitles, the viewer's field of vision may still become narrow by reading the subtitles, and therefore it may be difficult for the viewer to obtain the other information presented outside the viewer's field of vision. That is, it has been difficult to simultaneously grasp the information expressed as subtitles and the information expressed by means aside from subtitles, such as video.

In addition, the information that the viewer considers to be important is not limited to subtitle information, and information that is important to the viewer may be displayed in areas aside from the area in which the subtitles are displayed. For this reason, there has been such a risk that when viewing video in which subtitles are displayed, the viewer may miss important information.

In recent years, there has been an increase in the screen size of television receivers and display apparatuses connected to personal computers. When viewing such a large screen, it becomes even more difficult for the viewer to simultaneously fit both the video and subtitles in his/her field of vision.

It is also possible to display a plurality of programs and/or video content on a plurality of display apparatuses disposed next to one another or in different areas of a single display screen. In such cases, video and audio are simultaneously presented to viewers by different programs or media contents. This means that to clearly understand the information of the program being viewed, the viewer may have to concentrate harder to obtain the subtitle information. That is, there is the problem that it becomes even more difficult to simultaneously grasp the content expressed by video and the content expressed by subtitles.

As one example of a method of solving this problem, Japanese Unexamined Patent Application Publication No. 2007-13725 discloses that when displaying a plurality of programs on a plurality of screens, audio is outputted for one screen and subtitles are displayed on another screen.

SUMMARY OF THE INVENTION

However, even if the information presented using subtitles and the information presented using audio is changed according to the program as disclosed in Japanese Unexamined Patent Application Publication No. 2007-13725, when there is a lot of content to be displayed as subtitles, the viewer's eyes may end up following the subtitles in particular. In such case, viewers are thought to use visually obtained information with highest priority as the material for understanding content. Due to this situation, even if the information aside from the subtitles is presented as audio, it can still be difficult for the viewer to obtain information presented as audio. That is, even when the technology disclosed in Japanese Unexamined Patent Application Publication No. 2007-13725 is used, when there is a large amount of subtitles, it is difficult for the viewer to simultaneously grasp the subtitle information and the information aside from subtitles, such as video.

The present invention was conceived in view of the above and it is desirable to make it possible to easily grasp information expressed as subtitles and information expressed otherwise, such as by video, at the same time.

According to an embodiment of the present invention, there is provided an information presentation apparatus including a first image generating unit, a second image generating unit and an image combining unit. The first image generating unit generates an image based on a video signal. The second image generating unit generates a small image that is smaller than a display size of the image generated by the first image generating unit. The image combining unit generates a display image by placing the small image generated by the second image generating unit in a subtitle display area within the image based on the video signal where subtitles are displayed.

Accordingly, it is possible to superimpose an image with a small display size in the subtitle display area where subtitles are displayed.

According to an embodiment of the present invention, since a reduced image is superimposed in the subtitle display area where subtitles are displayed, both the subtitles and the small image may simultaneously enter the viewer's field of vision. Therefore, it may be possible for the viewer to simultaneously grasp both the content expressed by the subtitles and the content expressed by the image.

DESCRIPTION OF THE PREFERRED EMBODIMENTS

Preferred embodiments of the present invention will now be described with reference to the attached drawings.

An information presentation apparatus according to the present embodiment disposes a small image including information thought to be important to the viewer (hereinafter referred to as "important information") in the periphery of a position of the viewer's gaze or at a position within subtitles that corresponds to a present spoken content. By doing so, it becomes possible for the viewer to simultaneously grasp the information presented at the position of the viewer's gaze and the information important to the viewer.

In the present embodiment, as one example, the video displayed in the background for the subtitles is defined as the important information. Also, when the video is a program broadcast on television, since content that will be transmitted after the present viewing time and preview information relating to characters about to enter the screen can also be considered to be important information for the viewer U, such information is also regarded as important information.

Figure 1:
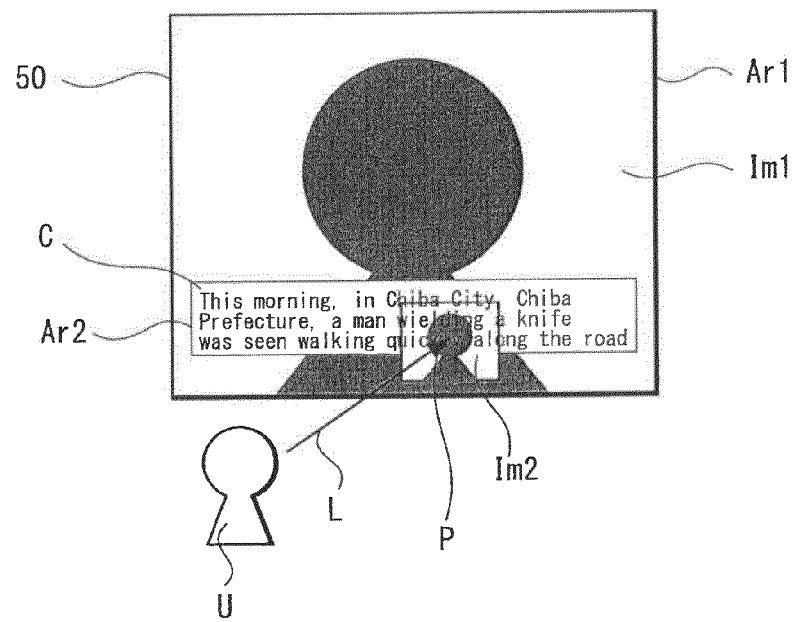
FIG. 1 is a schematic diagram showing an example of display system according to an embodiment of the present invention.

FIG. 1 is a schematic diagram showing an example of display system according to an embodiment of the present invention. As shown in FIG. 1, video is displayed on a display unit 50 constituting a display screen of a television receiver or the like. In FIG. 1, the entire screen of the display unit 50 is referred to as an "image display area Ar1". An image of a person is displayed as a normal image Im1 in this image display area Ar1.

A subtitle image C where audio information is expressed using text is displayed in a subtitle display area Ar2 at a lower part of the image display area Ar1. An important information image Im2 (small image) produced by reducing an image of the important information is displayed superimposed on the subtitle image C at a position of a gaze position P in front of the viewer U's line of sight L so that the important information image Im2 is displayed with the subtitle image C in the background. In the example shown in FIG. 1, since the information displayed in front of the viewer U's gaze is the subtitle image C, the important information image Im2 is displayed having been superimposed in the subtitle display area Ar2 where the subtitle image C is placed.

Figure 2:
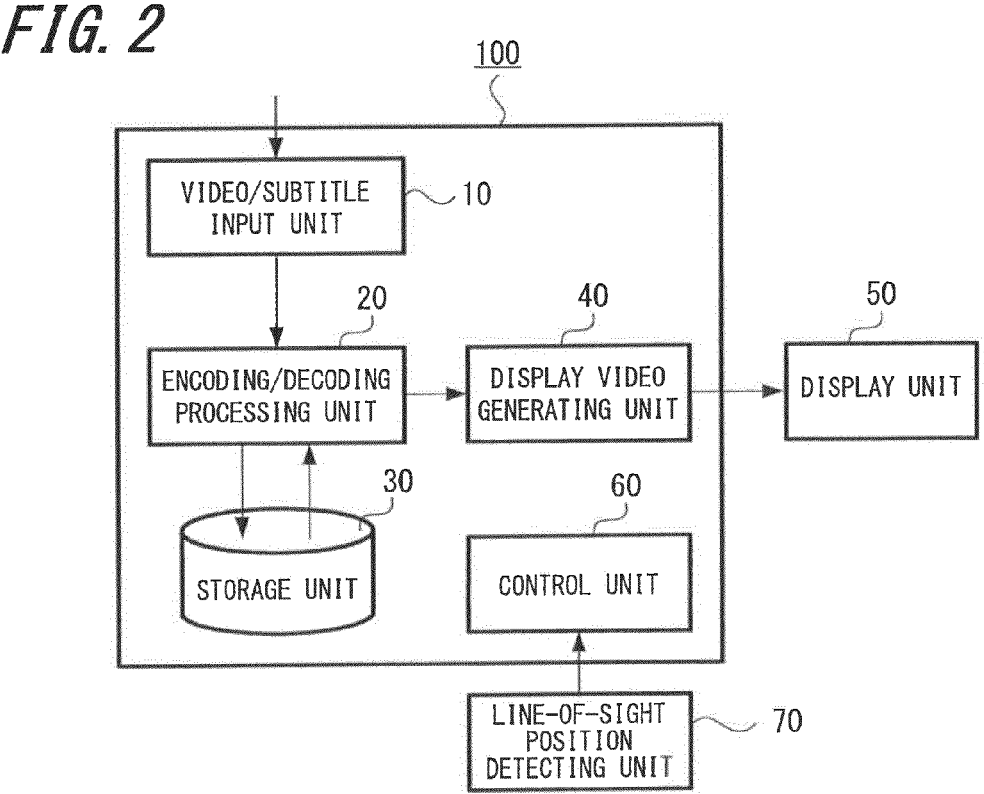
FIG. 2 is a block diagram showing an example of an internal configuration of an information presentation apparatus according to an embodiment of the present invention.

FIG. 2 shows an example of internal configuration of an information presentation apparatus 100 that realizes such display as described above. The information presentation apparatus 100 shown in FIG. 2 includes a video/subtitle input unit 10, an encoding/decoding processing unit 20, a storage unit 30, a display video generating unit 40, a display unit 50, a control unit 60, and a line-of-sight position detecting unit 70.

The video/subtitle input unit 10 receives an input of a video signal, an audio signal, and metadata such as subtitle information and loads such information into the information presentation apparatus 100. As examples, the video signal, audio signal, subtitle information, and the like are inputted from a tuner of a television receiver, a communication control unit that controls communication on a network, or an interface portion for a recording medium on which video content is recorded.

The encoding/decoding processing unit 20 encodes the video signal, audio signal, and subtitle information inputted from the video/subtitle input unit 10 and stores the encoding result in the storage unit 30. The encoded video data and encoded audio stored in the storage unit 30 are read out and decoded, and the video signal, audio signal, and subtitle information obtained by such decoding are outputted to the display video generating unit 40. As examples, the storage unit 30 is formed of a HDD (Hard Disk Drive), a DVD (Digital Versatile Disc), or the like, and stores the video signal, audio signal, and subtitle information encoded by the encoding/decoding processing unit 20.

The display video generating unit 40 generates video to be displayed on the display unit 50 using the video signal and subtitle information read from the storage unit 30 or the video signal and subtitle information inputted via the video/subtitle input unit 10. The generated video is then outputted to the display unit 50. The display video generating unit 40 is described in detail later in this specification. The display unit 50 is formed of an LCD (Liquid Crystal Display) or the like, and displays the video generated by the display video generating unit 40.

The control unit 60 includes an MPU (Micro Processing Unit) or the like, and controls the respective components of the information presentation apparatus 100. The line-of-sight position detecting unit 70 detects the position of the viewer U's line of sight from the position of the viewer U's eyes, and outputs the detected position of the viewer U's line of sight to the control unit 60 as the gaze position P. As the line-of-sight position detecting unit 70, a stationary apparatus may be used, but it is also possible to use a device worn by the viewer U. Note that when the line-of-sight position detecting unit 70 is formed of a stationary device, the position of the line-of-sight position detecting unit 70 is set at a position where it is easy to detect the line of sight of the viewer U, such as a position where the line-of-sight position detecting unit 70 faces the viewer U, for example. Alternatively, the position of the line of sight of the viewer U may be detected using a monitoring camera or the like set up at a distant position.

Figure 3:
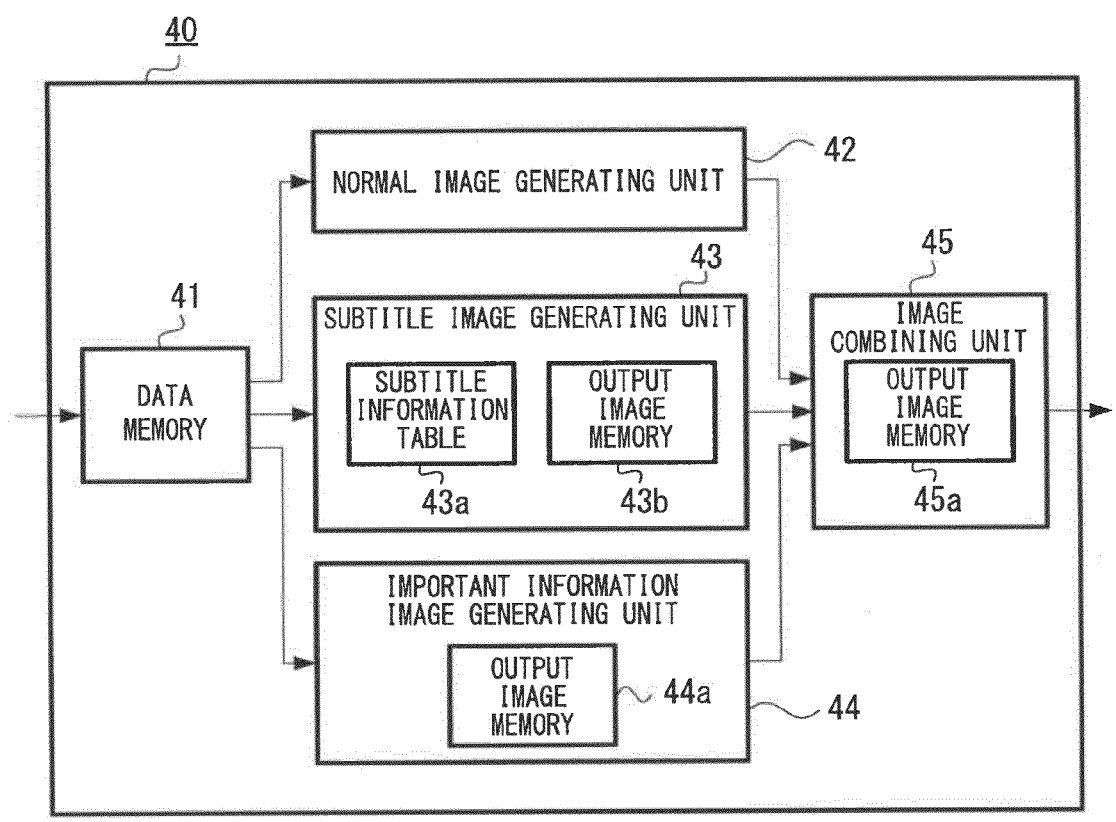
FIG. 3 is a block diagram showing an example of an internal configuration of a display video generating unit according to an embodiment of the present invention.

Next, an example of the internal configuration of the display video generating unit 40 will be described with reference to FIG. 3. The display video generating unit 40 includes a data memory 41, a normal image generating unit 42 as a first image generating unit, a subtitle image generating unit 43, an important information image generating unit 44 as a second image generating unit, and an image combining unit 45.

The data memory 41 is formed of a semiconductor memory or the like and, when processing is carried out by the normal image generating unit 42, the subtitle image generating unit 43, and the important information image generating unit 44, serves as a region for temporarily storing the video signal and subtitle information read from the storage unit 30.

The normal image generating unit 42 carries out processing that generates an image to be displayed as the normal image Im1 in the image display area Ar1 of the display unit 50. That is, scaling conversion or the like that converts the number of pixels of the video signal and subtitle information read from the storage unit 30 in accordance with the size of the display unit 50 is carried out and images after processing are outputted to the image combining unit 45.

The subtitle image generating unit 43 carries out processing of converting subtitle information inputted as metadata via the video/subtitle input unit 10 to an image, thereby generating the subtitle image C. According to the present embodiment, past spoken content and (future) spoken content about to be spoken are displayed using different colors in the subtitle image C displayed in the subtitle display area Ar2 (see FIG. 1) of the display unit 50. The subtitle image generating unit 43 carries out coloring processing for such subtitles and outputs the generated image to the image combining unit 45 as the subtitle image C.

The subtitle image generating unit 43 includes a subtitle information table 43a generated by dividing the subtitle information based on the subtitle content and appearance time and an output image memory 43b as a region for temporarily storing the subtitle information used to generate a subtitle image. The subtitle image generating unit 43 will be described later in detail.

The important information image generating unit 44 carries out processing of converting the information thought to be important to the viewer U ("important information") to an image and reduces such image to a size fit into the field of vision of a viewer U viewing the subtitle image C. The small image generated as described above is outputted to the image combining unit 45 as the important information image Im2. The important information image generating unit 44 also includes an output image memory 44a. The important information image generating unit 44 will also be described later in detail.

The image combining unit 45 combines the images outputted from the normal image generating unit 42, the subtitle image generating unit 43, and the important information image generating unit 44 to generate the display image for the display unit 50. In the present embodiment, the image combining unit 45 superimposes the subtitle image C outputted from the subtitle image generating unit 43 onto the normal image Im1 outputted from the normal image generating unit 42. The image combining unit 45 also places the important information image Im2 outputted from the important information image generating unit 44 at a position of the subtitle image C so as to be superimposed with the subtitle image C in the background.

Figure 4:
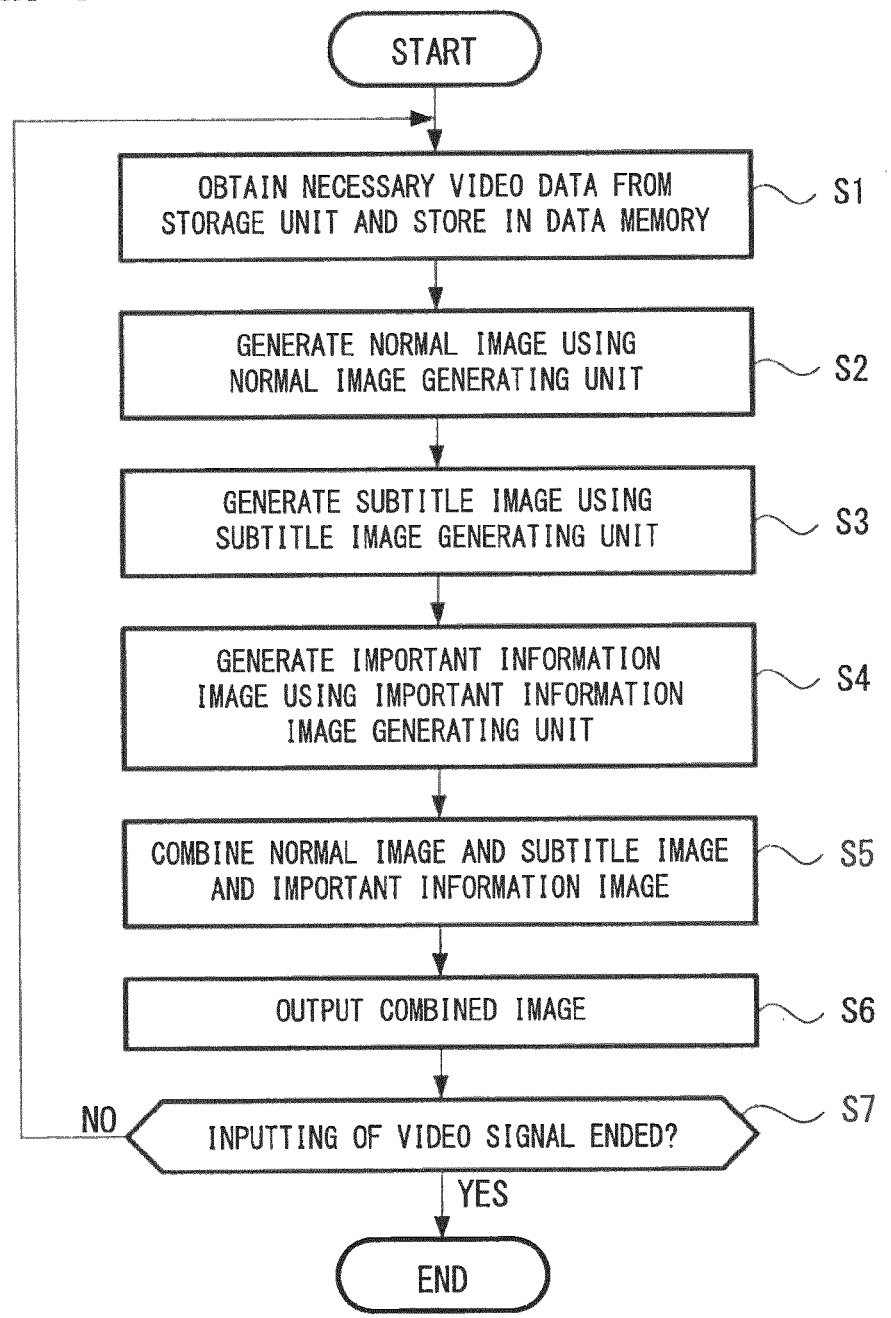
FIG. 4 is a flowchart showing an example of processing by the display video generating unit according to an embodiment of the present invention.

An example of processing by the display video generating unit 40 formed as described above will be described with reference to the flowchart in FIG. 4. In FIG. 4, the display video generating unit 40 first obtains data required to generate the normal image Im1, the important information image Im2, and the subtitle image C from the storage unit 30 (see FIG. 2) and stores the obtained data in the data memory 41 (step S1).

Subsequently, the data stored in the data memory 41 is used by the normal image generating unit 42 to generate the normal image Im1 (step S2), by the subtitle image generating unit 43 to generate the subtitle image C (step S3), and by the important information image generating unit 44 to generate the important information image Im2 (step S4). The normal image Im1, the subtitle image C and the important information image Im2 are combined by the image combining unit 45 (step S5) and the display image generated by such combining is outputted to the display unit 50 (step S6). Finally, it is determined whether the inputting of the video signal has ended, and if the inputting has ended, the processing is terminated. If the inputting of the video signal is still continuing, the processing returns to step S1 and the processing is continued.

Figures 5, 6:
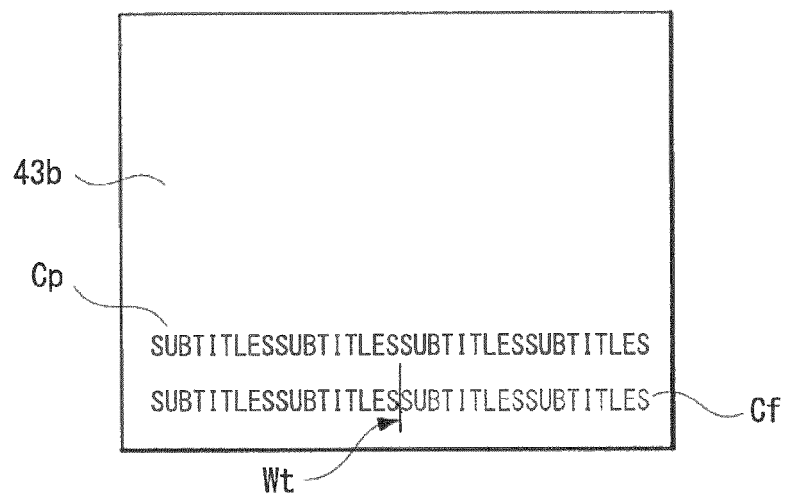
FIG. 5 is a schematic diagram showing an example configuration of a subtitle information table according to an embodiment of the present invention.
FIG. 6 is a schematic diagram showing an example configuration of an output image memory according to an embodiment of the present invention.

Next, the subtitle image generating unit 43 will be described in detail with reference to FIGS. 5 to 7. FIG. 5 is a diagram showing one example configuration of the subtitle information table 43a provided in the subtitle image generating unit 43. In the subtitle information table 43a, all of the subtitle information included in one program, for example, is grouped into subtitle sets. A display start time Ts, a display end time Te and the subtitle content on the screen are shown for each subtitle set produced by the grouping. The display start time Ts and the display end time Te are expressed as elapsed seconds from the start of media content, such as a program. Each "subtitle no." is a number assigned to the subtitle sets in order starting from the earliest display start time.

In the example shown in FIG. 5, information for a subtitle set that starts with the expression "This is the Lunchtime News" is written for "subtitle no. 0". From the content of the subtitle information table 43a, it can be understood that this subtitle is displayed on the screen at a time (the display start time Ts) 1.2 seconds after the start of the program and such display ends at a time (the display end time Te) when 5.5 seconds have elapsed. Information on the subtitle to be displayed next is registered as "subtitle no. 1". Information where the display start time Ts is 7.3 seconds, the display end time Te is 12.1 seconds, and the subtitle content is "This morning, in Chiba, . . . " is given for "subtitle no. 1". That is, it can be understood that a subtitle set that starts with the expression "This morning, in Chiba, . . . " is displayed from a time 7.3 seconds after the start of the program to a time 12.1 seconds after the start.

FIG. 6 shows one example configuration of the output image memory 43b used when the subtitle image generating unit 43 generates the subtitle image C. The vertical direction and the horizontal direction in the output image memory 43b correspond to the vertical direction and the horizontal direction in the subtitle display area Ar2 of the display unit 50. In the output image memory 43b, the $i^{th}$ (where i is a natural number) subtitle information in the subtitle information table 43a shown in FIG. 5 is written in a time series in a direction from upper left to lower right in the output image memory 43b.

In the subtitle image generating unit 43, processing is carried out for the text of the respective subtitles placed in the output image memory 43b to calculate a position corresponding to the content being spoken in the video and such position is outputted to the image combining unit 45 as the present position Wt. The present position Wt outputted here is expressed as coordinates or the like in the output image memory 43b, for example.

The subtitle image generating unit 43 also carries out processing that uses the calculated present position information to apply a past font Cp to characters positioned preceding the present position and a future font Cf to characters positioned after the present position. The past font Cp and the future font Cf are used in the subtitle image C displayed in the subtitle display area Ar2 to visually and clearly display subtitles corresponding to a spoken content that has already been given and subtitles corresponding to a spoken content that is about to be given with the present time as the base point. As one example, a blue character font is used as the past font Cp and a yellow character font is used as the future font Cf. It is also possible to change the font type or font face.

Figure 7:
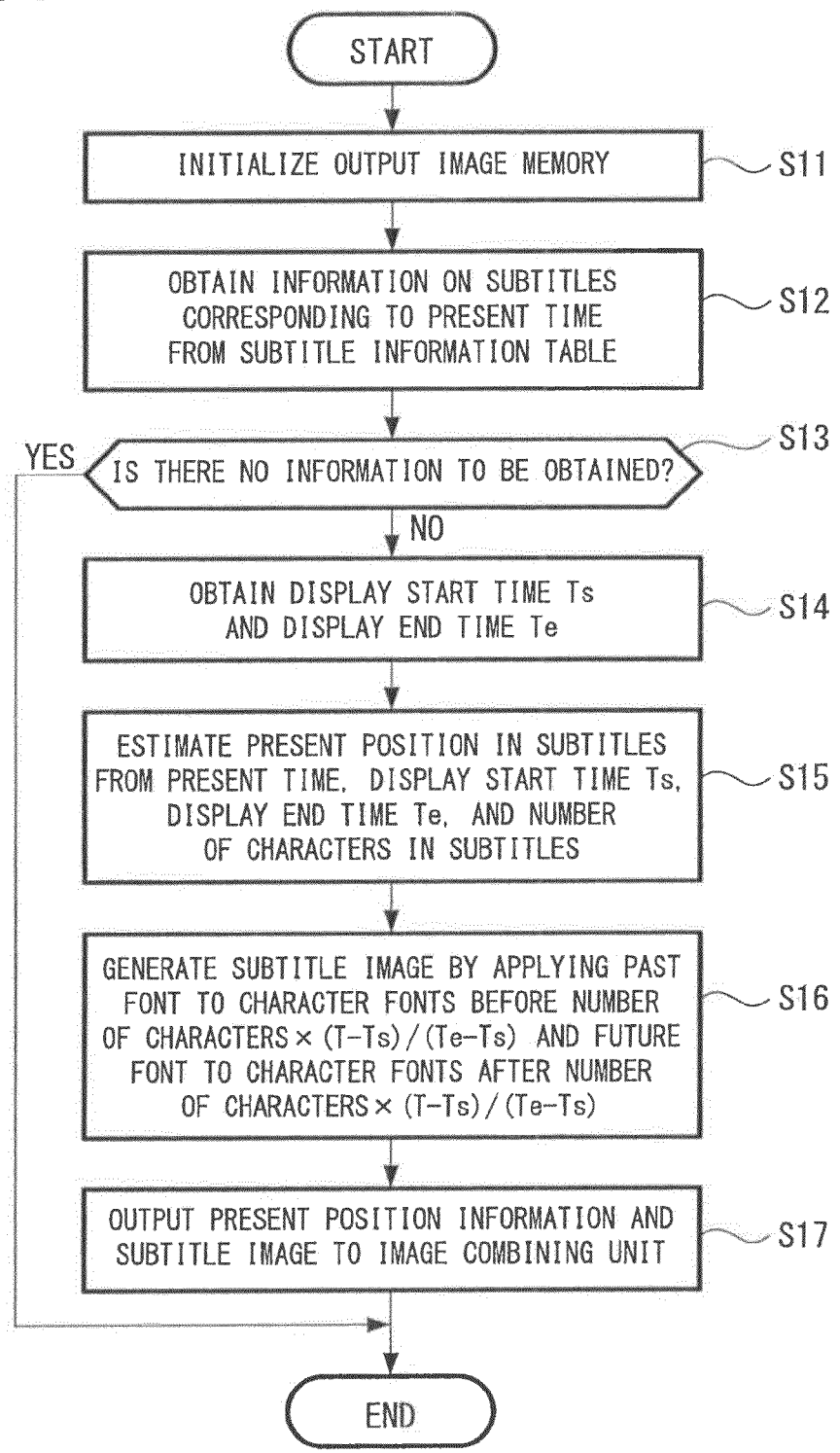
FIG. 7 is a flowchart showing an example of processing by a subtitle image generating unit according to an embodiment of the present invention.

FIG. 7 is a flowchart showing one example of a subtitle image generating carried out by the subtitle image generating unit 43. The subtitle image generating unit 43 first initializes the output image memory 43b using a transparent color (step S11). After initialization, the information on the subtitles corresponding to the present time T is obtained from the subtitle information table 43a (step S12).

The "present time T" referred to here designates a time elapsed from a reproduction start time of the video signal and is expressed as a number of seconds, such as "4.0 seconds". The "information on subtitles corresponding to the present time T" designates subtitle information where the "present time T" is included between the display start time Ts and the display end time Te in the subtitle information with the subtitle no. 0 to the subtitle no. n (where n is a natural number) in the subtitle information table 43a. When the number of seconds used as the present time T is 8.0 seconds for example, such 8.0 seconds is included in the range from 7.3 seconds to 12.1 seconds in the subtitle information table 43a. Accordingly, in step S12, the subtitle information with subtitle no. 1 whose display start time Ts is 7.3 seconds and whose display end time Te is 12.1 seconds is read.

When the number of seconds used as the present time T is 19.0 seconds for example, such 19.0 seconds falls between the display end time Te of the subtitle information of subtitle no. 2 and the display start time Ts of the subtitle information of subtitle no. 3. Hence, in step S13 in FIG. 7 at a branch that determines whether there is no information to be obtained, "Yes" is selected due to "no information to be obtained". That is, during a video period where no subtitle information is included, processing by the subtitle image generating unit 43 is not carried out.

When it has been determined in step S13 that there is information to be obtained, next processing is carried out to read the display start time Ts and the display end time Te of the obtained subtitle information from the subtitle information table 43a (step S14). Subsequently, the position of the subtitles (text) corresponding to the spoken content in the video is calculated based on the present time T, the display start time Ts and display end time Te, and the number of characters in the subtitle included in the read out subtitle information (step S15).

Further, the subtitle image generating unit 43 carries out processing of applying the past font Cp and the future font Cf described above to the subtitles representing the subtitle information that has been read out. More specifically, the past font Cp is applied to characters positioned before (i.e., to the left of or above) a position calculated by the equation: number of characters×(present time T−display start time Ts)/(display end time Te−display start time Ts). Also, processing that applies the future font Cf for characters positioned after (i.e., to the right or below) the position calculated by the equation: number of characters×(present time T−display start time Ts)/(display end time Te−display start time Ts) is carried out (step S16).

Subsequently, the present position information obtained in step S15 and the subtitle image C obtained by the processing carried out in step S16 are outputted to the image combining unit 45 (step S17).

Figure 8:
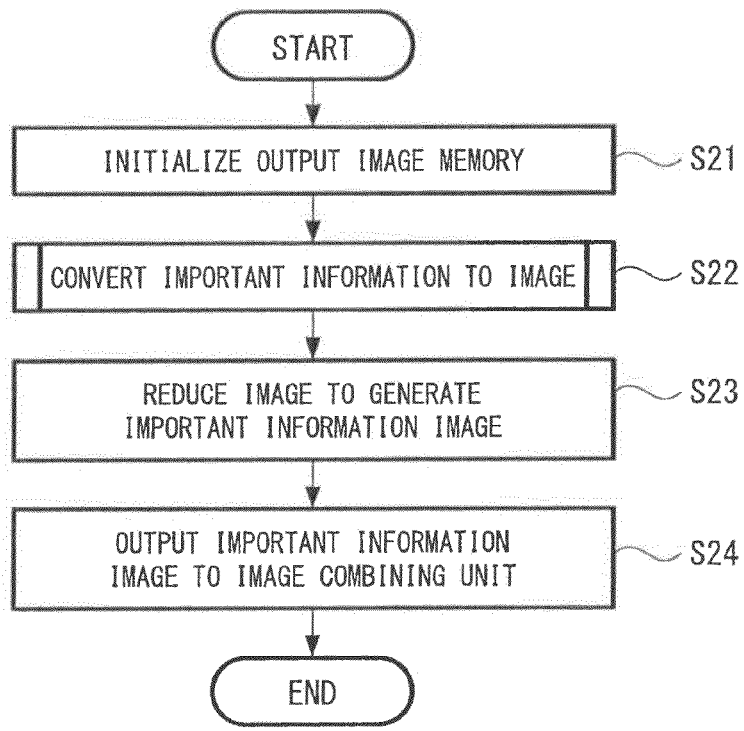
FIG. 8 is a flowchart showing an example of processing by an important information image generating unit according to an embodiment of the present invention.

Next, an example of processing by the important information image generating unit 44 will be described with reference to the flowchart in FIG. 8. The important information image generating unit 44 first initializes the output image memory 44a (step S21) and converts the important information to an image (step S22). In addition, by reducing the important information converted to an image, the important information image Im2 is generated (step S23). Subsequently, the generated important information image Im2 is outputted to the image combining unit 45 (step S24). The processing that converts the important information to an image in step S22 is predefined processing where the processing changes according to the content handled as the important information.

FIGS. 9 to 15 illustrate the details of the predefined processing carried out by the important information image generating unit 44 for each type of content handled as the important information and example displays on the display unit 50.

Figure 9:
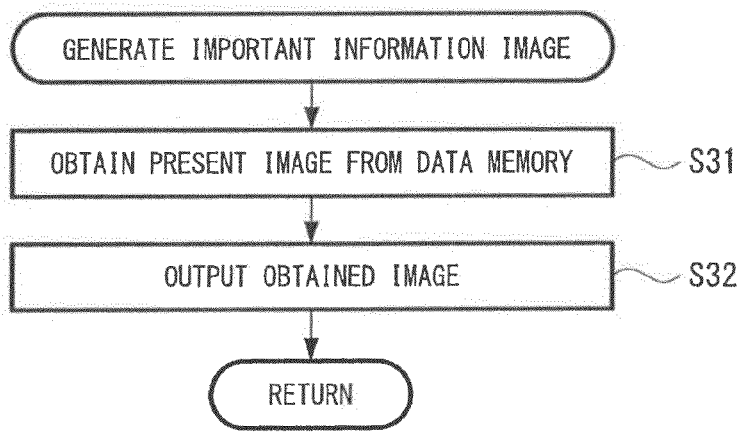
FIG. 9 is a flowchart showing an example of processing by the important information image generating unit according to an embodiment of the present invention in a case where a present image is set as the important information.

The flowchart in FIG. 9 shows an example of predefined processing when the normal image Im1 displayed in the image display area Ar1 of the display unit 50 is regarded as the important information. When the normal image Im1 is regarded as the important information, the important information image generating unit 44 first obtains, from the data memory 41 (see FIG. 3), the present image which includes a time code corresponding to the present time T (step S31), and outputs the obtained present image (step S32). That is, the same image as the normal image Im1 is set as the important information image Im2.

Figure 10:
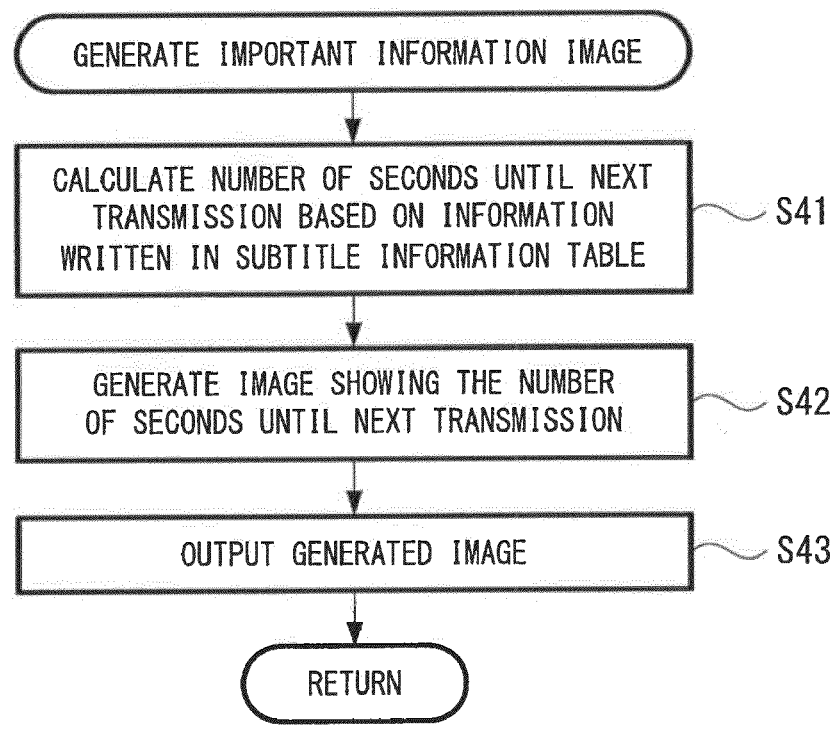
FIG. 10 is a flowchart showing an example of predefined processing by the important information image generating unit according to an embodiment of the present invention when a number of seconds until a next transmission is set as the important information.

FIG. 10 shows an example of predefined processing where, in media content formed of a video signal, preview information for a planned content transmitted after a predetermined time has elapsed from the present time T is set as the important information. The important information image generating unit 44 first obtains the number of seconds until the next transmission based on the information given in the subtitle information table 43a (step S41).

When the present time T is 5.5 seconds, for example, according to the subtitle information table 43a shown in FIG. 5, the time at which the next subtitle is displayed is 7.3 seconds that is the display start time Ts of subtitle no. 1. Accordingly, the number of seconds until the next transmission is given as 7.3−5.5=1.8 seconds.

Figure 11:
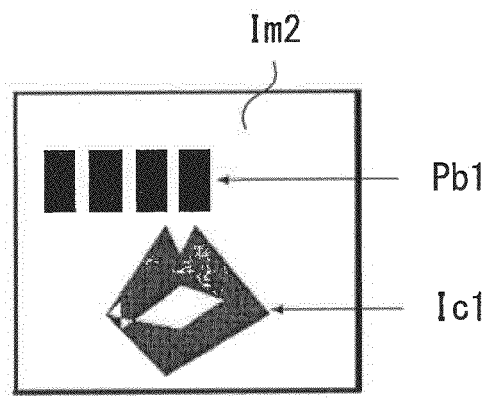
FIG. 11 is a schematic diagram showing an example of an important information image according to an embodiment of the present invention.

Next, an image showing the number of seconds until the next transmission is generated (step S42) and the generated image is outputted (step S43). The image generated in step S42 is an image such as that shown in FIG. 11, for example. In FIG. 11, the number of seconds until the next transmission is expressed by a progress bar Pb1 where the number of bars falls as time elapses. To allow the user to grasp that the progress bar Pb is displaying the number of seconds until the next transmission, an icon (transmission icon Ic1) that is a visual representation of "speech" is also shown below the progress bar Pb1.

By displaying the important information image Im2 at the gaze position P of the viewer U or at the present position in the subtitle image C, the viewer U can simultaneously grasp the information expressed by the subtitle image C and the number of seconds until the next transmission expressed by the important information image Im2.

Next, an example where preview information for a planned topic presented after a predetermined period has elapsed from the present time T is set as the important information will be described with reference to FIGS. 12 to 14. The example described below corresponds to a situation where a topic name showing the subject of the topic has been added in advance as metadata to the data inputted via the video/subtitle input unit 10 (see FIG. 2).

Figures 12, 13:
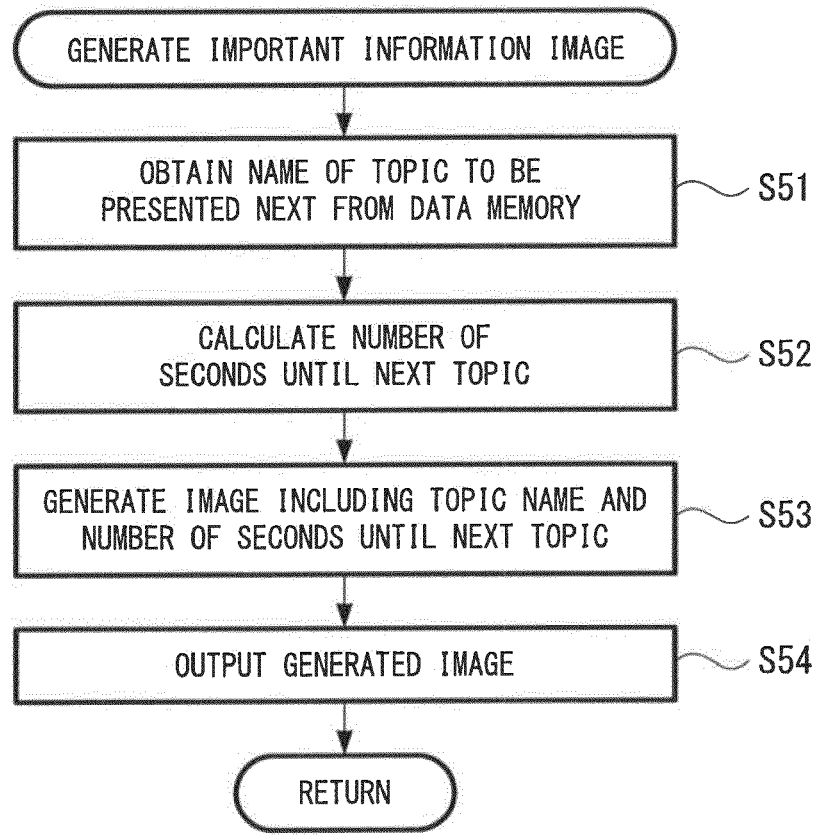
FIG. 12 is a flowchart showing an example of processing by the important information image generating unit when the number of seconds until the next topic appears is set as the important information according to an embodiment of the present invention.
FIG. 13 is a schematic diagram showing an example configuration of a correspondence table for topic names and images indicating topic names according to an embodiment of the present invention.

FIG. 12 is a flowchart showing the predefined processing by the important information image generating unit 44 in such case. The important information image generating unit 44 obtains the name of the planned topic presented after the present time from the data memory 41 (step S51). Subsequently, by calculating the difference between the display start time Ts of the topic and the present time T, the number of seconds until the next topic is obtained (step S52). Next, an image showing the number of seconds until the next topic and the topic name is generated (step S53) and the generated image is outputted (step S54).

Images (icons) showing topic names are prepared in advance corresponding to the topic names. Subsequently, an icon associated with a topic name is extracted using the topic name as a key. FIG. 13 shows an example configuration of a table in which the correspondence between topic names and icons is given. In the table shown in FIG. 13, "news", "baseball", "music" and the like are displayed as the topic names, and images associated with the respective topic names are registered as the icons for each topic name.

Note that the image showing a topic is not limited to an icon and it is also possible to use an image that is to be actually presented.

Figure 14:
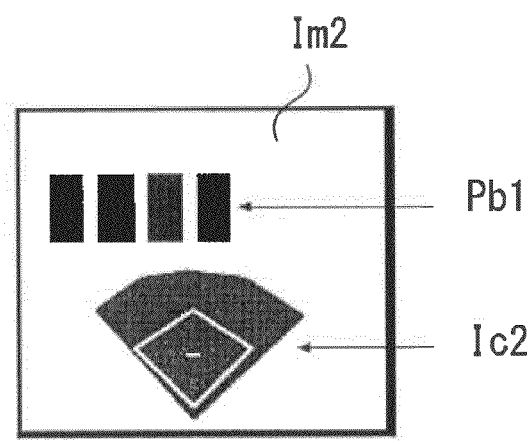
FIG. 14 is a schematic diagram showing an example of an important information image according to an embodiment of the present invention.

FIG. 14 shows an example of an image showing the number of seconds until the next topic and the content of the next topic.

FIG. 14 shows an example where a progress bar Pb1 showing the number of seconds until the next topic and an icon Ic2 showing the topic (in this case, baseball) are displayed as the important information image Im2. By displaying the important information image Im2 formed in this way in the periphery of the subtitle display area Ar2 for the subtitle image C, the viewer U, while reading the subtitles, can simultaneously grasp the type of topic to be given next and the number of seconds until spoken content about the next topic starts.

Note that instead of the topic, it is possible to set information on characters as the important information. In such case, an image Ic3 showing a character who is next onscreen and a number of seconds until such character appears can be displayed as the important information image Im2.

Figure 15:
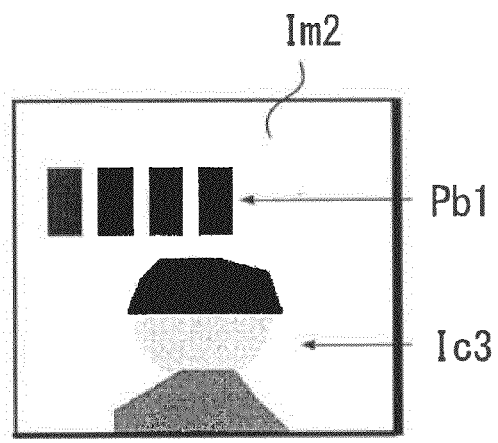
FIG. 15 is a schematic diagram showing an example of an important information image according to an embodiment of the present invention.

FIG. 15 shows an example configuration of the important information image Im2 for a case where information relating to the next character is set as the important information. In FIG. 15, in the same way as the example described above, the number of seconds until the next character appears onscreen is shown by the progress bar Pb1 and an image Ic3 of the next character to appear onscreen is simultaneously displayed. Although an example where actual video is used as the image Ic3 of the character to appear onscreen next is given in FIG. 15, the image Ic3 is not limited thereto. It is also possible to display a sketched portrait showing the character as an icon.

Figure 16:
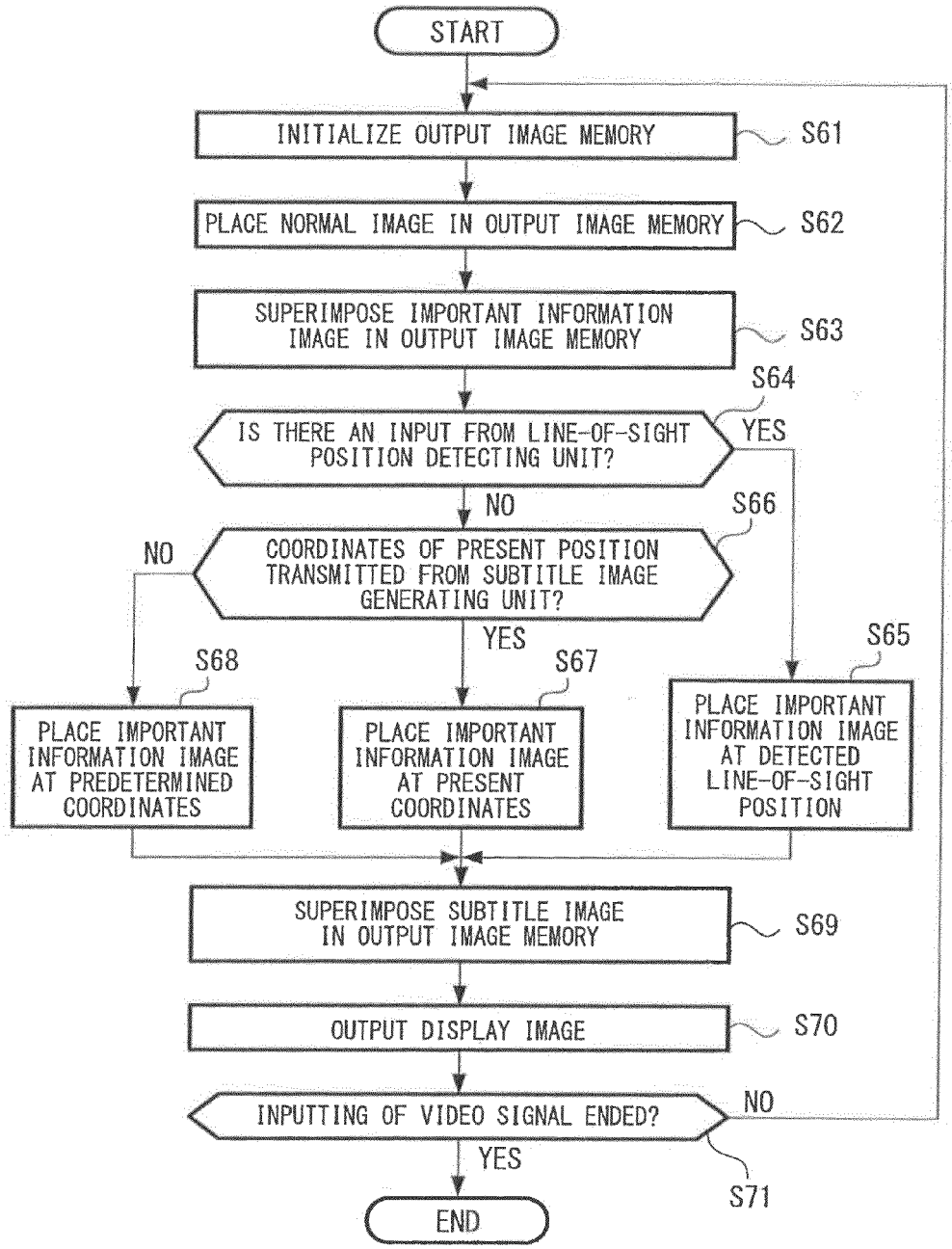
FIG. 16 is a flowchart showing an example of processing by an image combining unit according to an embodiment of the present invention.

Next, an example of processing by the image combining unit 45 will be described with reference to the flowchart in FIG. 16. In FIG. 16, the image combining unit 45 first initializes an output image memory 45a (see FIG. 3) (step S61) and places the normal image Im1 outputted from the normal image generating unit 42 (see FIG. 3) in the output image memory 45a (step S62). Subsequently, the important information image Im2 outputted from the important information image generating unit 44 is placed in the output image memory 45a (step S63).

Next, it is determined whether the gaze position P has been inputted from the line-of-sight position detecting unit 70 (see FIG. 2) (step S64), and when input from the line-of-sight position detecting unit 70 has been detected, the important information image Im2 is placed at the inputted gaze position P (step S65). When it has not been possible to confirm input from the line-of-sight position detecting unit 70, next, it is determined whether coordinates of the present position in the subtitles have been transmitted from the subtitle image generating unit 43 (step S66).

When the coordinates of the present position have been transmitted from the subtitle image generating unit 43, that is, when the processing of generating the subtitle image C has been carried out by the subtitle image generating unit 43, the image combining unit 45 disposes the important information image Im2 at the coordinates shown as the present position (step S67). When the coordinates of the present position have not been transmitted from the subtitle image generating unit 43, the important information image Im2 is disposed at predetermined coordinates that are set in advance (step S68).

Next, the subtitle image C outputted from the subtitle image generating unit 43 is superimposed on the output image memory 45a (step S69) and the display image generated in this way is outputted to the display unit 50 (step S70). Here, it is determined whether inputting of the video signal into the image combining unit 45 has ended (step S71) and when the inputting of the video signal is continuing, the processing returns to step S61 and continues thereafter. When the inputting of the video signal has ended, the processing is also terminated. Note that although in the present embodiment, the important information image Im2 is placed at predetermined coordinates set in advance when the coordinates of the present position have not been transmitted from the subtitle image generating unit 43, it is also possible to carry out other processing. For example, it is possible to carry out such processing that may not display the important information image Im2 or displays the important information image Im2 at the same position as the previous subtitle end position. Alternatively, it is possible to selectively set such processes by switching between modes.

According to the present embodiment described above, since the important information image Im2 is placed at the gaze position P of the viewer U or at a position corresponding to the present spoken content in the subtitle image C, the viewer U can obtain the content expressed as the important information image Im2 at the same time as obtaining the information of the subtitles.

In particular, when a large screen is being viewed, by reducing the normal image Im1 to prepare the important information image Im2 and placing the important information image Im2 in the subtitle display area Ar2, it becomes possible for the viewer U to fit both the normal image Im1 displayed in the entire screen and the subtitles showing a spoken content of the normal image Im1 in his/her field of vision. That is, the content expressed as the subtitles and the information in the normal image Im1 expressed as the important information can be grasped at the same time.

Accordingly, compared to the case where an embodiment of the present invention is not used, the amount by which the viewer U moves his/her line of sight can be reduced, allowing the viewer U's burden to be reduced when viewing video.

According to the present embodiment described above, in the subtitle image C, a location corresponding to the present spoken content in the video is set as the present position, subtitles corresponding to the spoken content before such position are displayed using a past font Cp, and subtitles corresponding to the spoken content after such position are displayed using a future font Cf. By doing so, the viewer U can easily and visually grasp the correspondence between the content displayed as the subtitles and the spoken content.

In this case, since the position at which the important information image Im2 is placed is found from the present position in the subtitles, the important information image Im2 can move together with the change in the present position. Accordingly, at the same time as grasping the correspondence between the content displayed as the subtitles and the spoken content, the viewer U can also grasp the content being presented by the important information image Im2.

Note that when there is a small amount of subtitles to be displayed in the subtitle display area Ar2, for example one line of subtitles, instead of moving the important information image Im2 in accordance with the present position, the placed position of the important information image Im2 may be fixed at a predetermined position in the subtitle display area Ar2. Also, the position at which the important information image Im2 is placed is not limited to the background of the subtitles, and may be between lines in the subtitles or in an area in the periphery of the subtitle display area Ar2.

Although an example where information relating to the video (program) being displayed on the display unit 50 is set as the important information has been given in the present embodiment described above, it is also possible to present other information as the important information. For example, an image displayed in an area used as a subscreen (inset window) for PinP (Picture In Picture) where images are combined by superimposing may be set as the important information.

Figure 17:
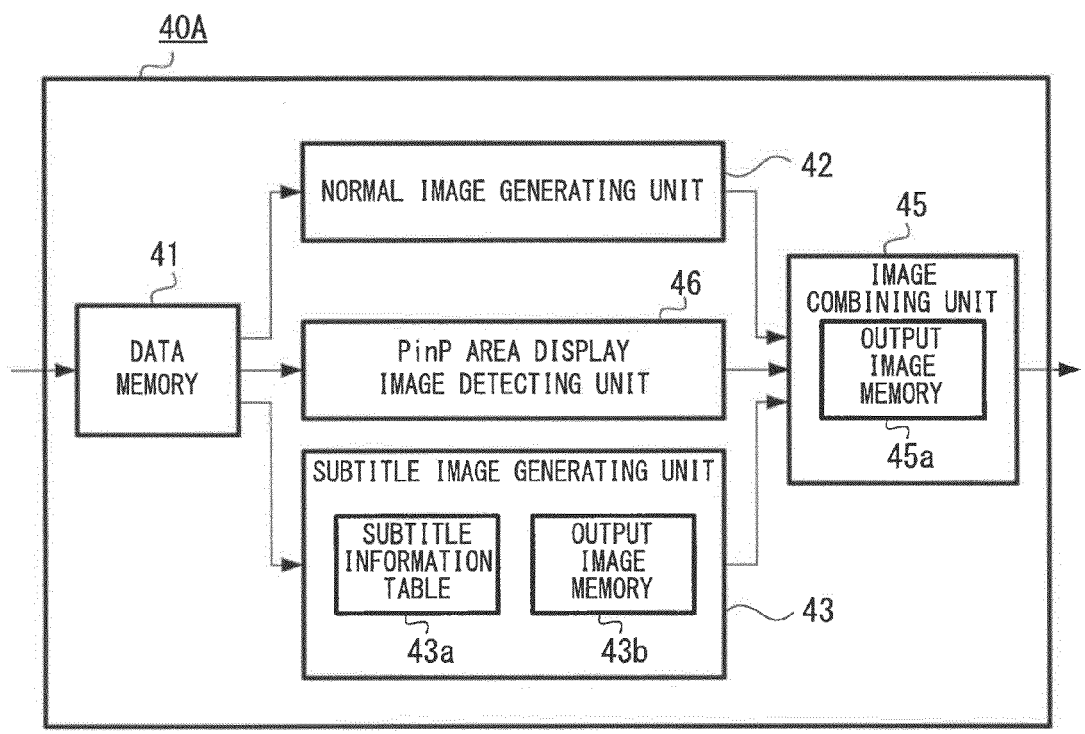
FIG. 17 is a block diagram showing another example of an internal configuration of a display video generating unit according to an embodiment of the present invention in a case where a PinP area display image is set as the important information.

FIG. 17 shows an example configuration of a display video generating unit 40A in such case. In FIG. 17, parts that are the same as in FIG. 3 have been assigned the same reference numerals and description thereof is omitted. The display video generating unit 40A includes a PinP area display image detecting unit 46 in place of the important information image generating unit 44.

Figure 18:
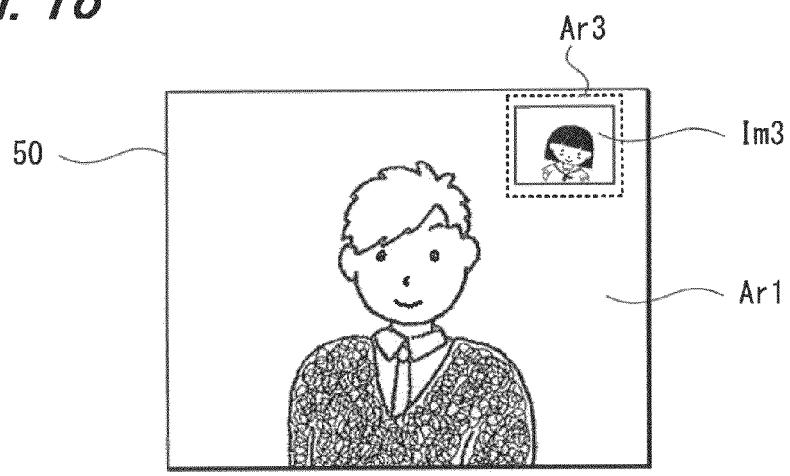
FIG. 18 is a schematic diagram showing another example display of video including a PinP area according to an embodiment of the present invention.

As shown in FIG. 18, when a PinP area Ar3 is superimposed on the image display area Ar1, the PinP area display image detecting unit 46 carries out processing that extracts an image (PinP area display image) Im3 displayed in the PinP area Ar3. In the same way as the important information image generating unit 44, the PinP area display image detecting unit 46 generates a small image by reducing the extracted image and outputs such image to the image combining unit 45 as the important information image Im2.

Figure 19:
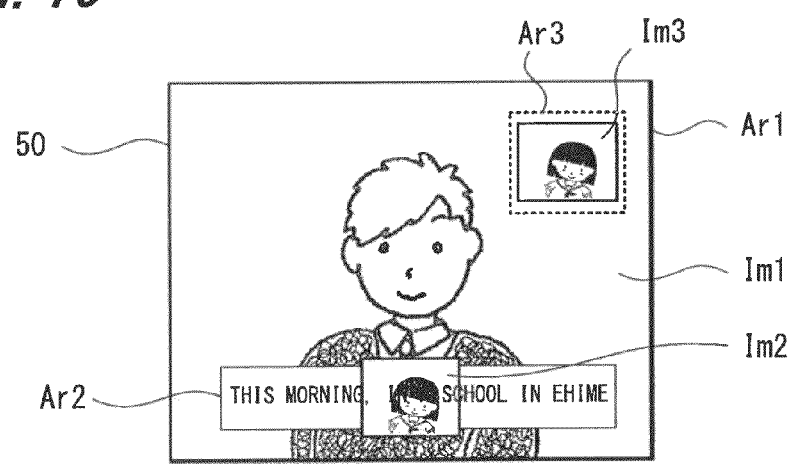
FIG. 19 is a schematic diagram showing another example display when a PinP area display image is set as important information according to an embodiment of the present invention.

FIG. 19 shows a state where the image outputted by the PinP area display image detecting unit 46 is superimposed on the subtitle display area Ar2 as the important information image Im2. When the display unit 50 is a large screen and the position of the PinP area Ar3 and the position of the subtitle display area Ar2 are distant as shown in FIGS. 18 and 19, it may be difficult for the viewer U to obtain both information at the same time. In this case, as shown in FIG. 19, if the PinP area display image Im3 is displayed superimposed on the subtitle display area Ar2 as the important information image Im2, it may be possible for the viewer U to fit both the PinP area display image Im3 and the subtitles in his/her field of vision without greatly moving his/her line of sight.

When a program broadcast on television or the like is displayed in the image display area Ar1 of the display unit 50, it is possible to display a different program or the like being broadcast on another channel at the same time as the important information image Im2.

Figure 20:
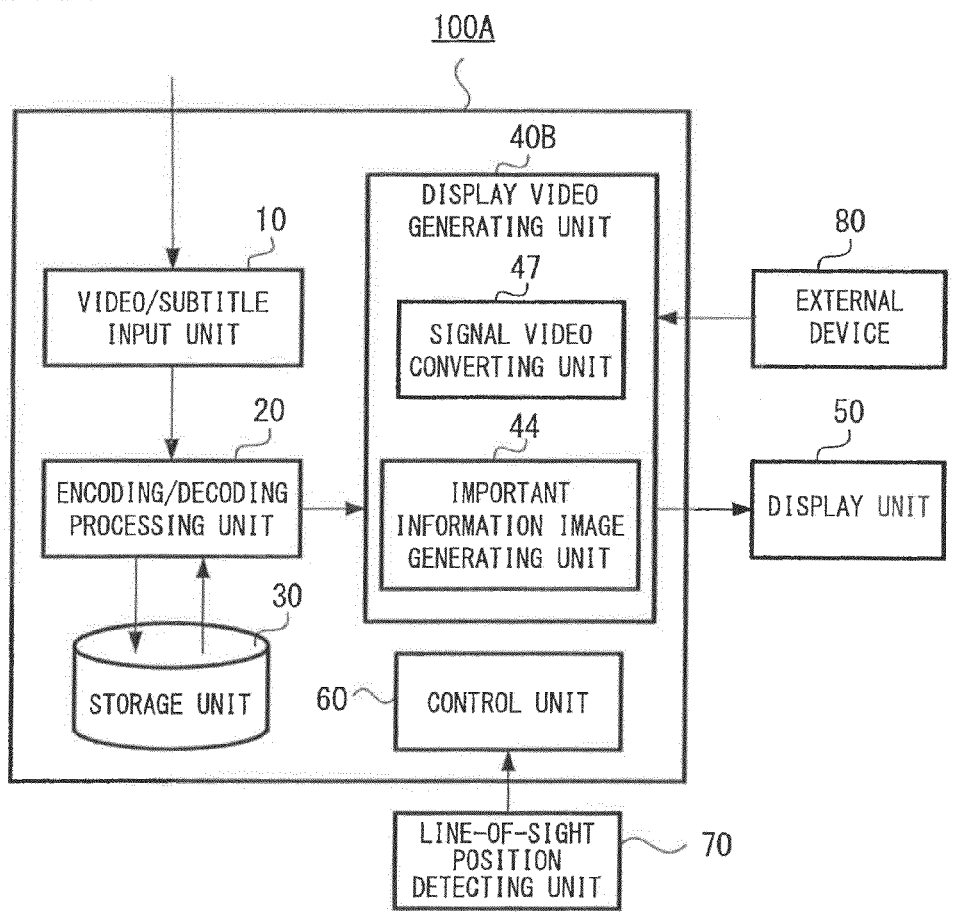
FIG. 20 is a block diagram showing another example of the internal configuration of an information presentation apparatus according to an embodiment of the present invention.

Also, although an example where information relating to a video signal is set as the important information has been given in the present embodiment described above, the information inputted from an external device 80 such as an intercom may be set as the important information. FIG. 20 shows an example configuration of an information presentation apparatus 100A in such case. In FIG. 20, parts that are the same as in FIG. 2 have been assigned the same reference numerals and description thereof is omitted.

The information presentation apparatus 100A shown in FIG. 20 is connected to the external device 80 as an intercom. In addition, a signal video converting unit 47 that carries out processing of converting a signal inputted from the external device 80 to an image is provided in a display video generating unit 40B. The important information image generating unit 44 reduces the image inputted from the signal video converting unit 47 to generate the important information image Im2 and outputs the generated important information image Im2 to the image combining unit 45 (not shown in FIG. 20).

Figure 21:
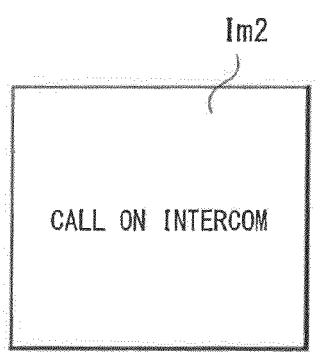
FIG. 21 is a schematic diagram showing another example configuration of an important information image according to an embodiment of the present invention.

The important information image generating unit 44 shown in FIG. 20 outputs an image such as that shown in FIG. 21, for example, to the image combining unit 45 as the important information image Im2. FIG. 21 shows a state where the text "Call on Intercom" is displayed as the important information image Im2. In this way, aside from converting the signal inputted via the intercom to character information, video showing a visitor inputted via the intercom may be displayed as the important information image Im2.

It is also possible to connect a monitoring camera as the external device 80 and to present video inputted from the monitoring camera as the important information image Im2.

Figure 22:
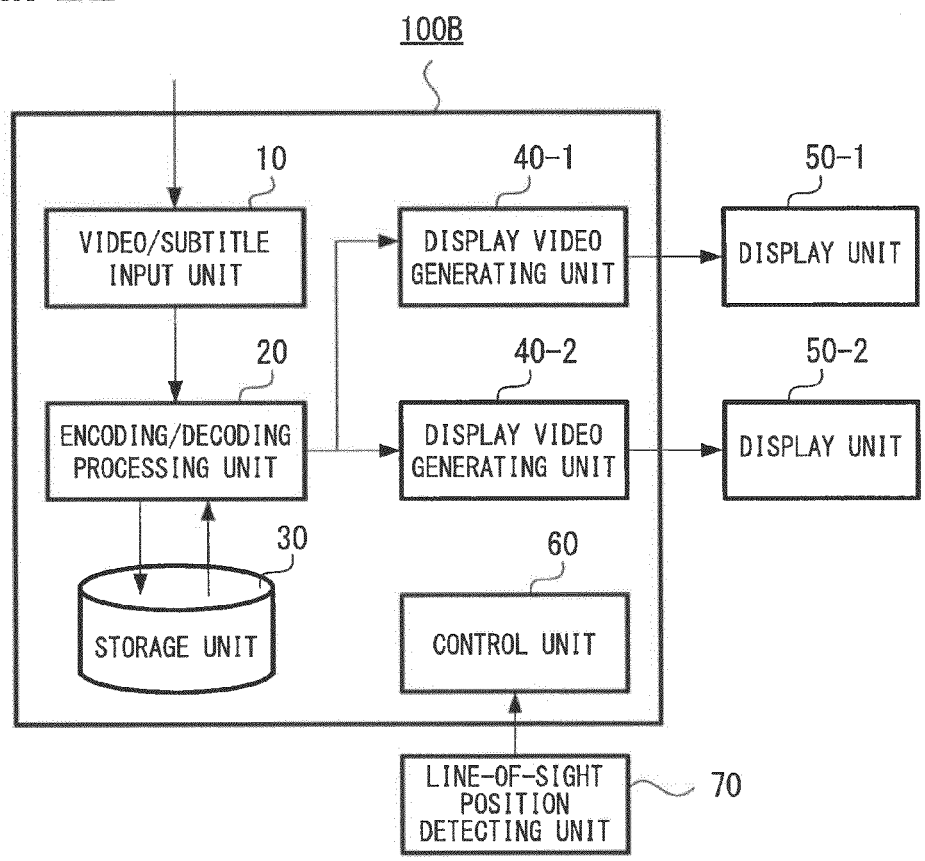
FIG. 22 is a block diagram showing another example of the internal configuration of an information presentation apparatus including a plurality of display units according to an embodiment of the present invention.

In addition, although a configuration where only one display unit 50 is used has been given in the embodiment described above, a configuration that uses a plurality of display units 50 can be given according to another example. FIG. 22 shows an example configuration of an information presentation apparatus 100B where two display units 50 are used. In FIG. 22, parts that are the same as in FIG. 2 or FIG. 20 have been assigned the same reference numerals and description thereof is omitted The information presentation apparatus 100B shown in FIG. 22 includes two display units, the display unit 50-1 and the display unit 50-2, and also includes a display video generating unit 40-1 that outputs a display image to the display unit 50-1 and a display video generating unit 40-2 that outputs a display image to the display unit 50-2. The display video generating units 40-1, 40-2 in FIG. 22 have the same configuration as the display video generating unit 40 shown in FIG. 3 and carry out the same processing as the processing shown in FIG. 4. In the information presentation apparatus 100B, the normal image Im1 displayed in each image display area Ar1 of the display units 50-1, 50-2 is set as the important information.

Figure 23:
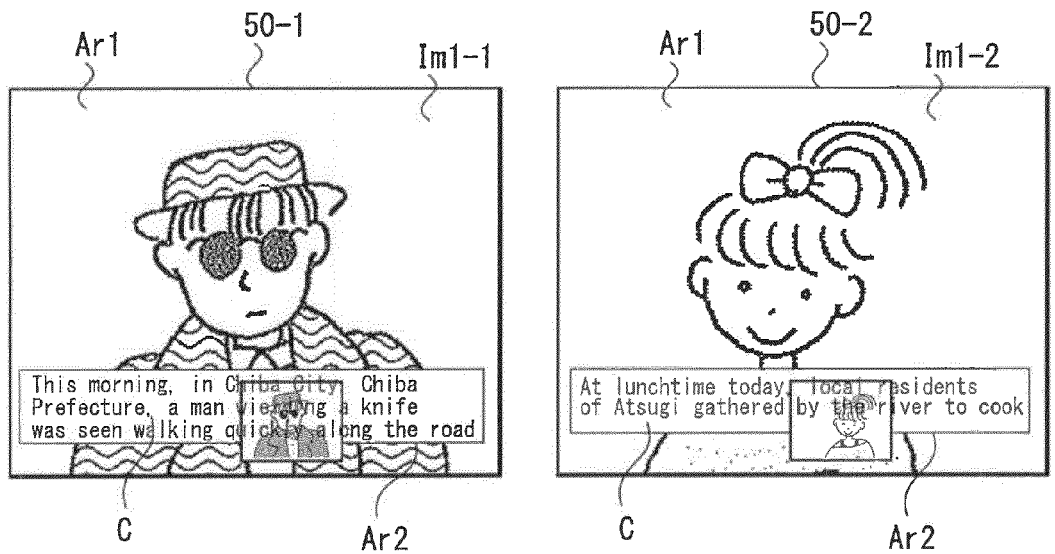
FIG. 23 is a schematic diagram showing another example of presentation by a plurality of display units according to an embodiment of the present invention.

FIG. 23 shows an example display by the information presentation apparatus 100B configured as described above. As shown in FIG. 23, the display unit 50-1 and the display unit 50-2 are disposed next to one another, an image of a man wearing sunglasses is displayed in the image display area Ar1 of the display unit 50-1, and an image of a girl whose hair has been tied up is displayed in the image display area Ar1 of the display unit 50-2. Subtitle images C corresponding to the respective video are displayed in the lower parts of the respective screens and the respective important information images Im2 are placed at positions corresponding to the present spoken content (or the gaze position P detected by the line-of-sight position detecting unit 70).

On the display unit 50-1, the important information image Im2 is a reduced image of the man shown as the normal image Im1-1 and on the display unit 50-2, the important information image Im2 is a reduced image of the girl shown as the normal image Im1-2.

As shown in FIG. 23, when different video (media content) are displayed on a plurality of screens, compared to the case where there is one display screen, it becomes difficult for the viewer U to grasp the content expressed by the respective video. Accordingly, in many cases the viewer U may end up concentrating on reading the subtitles. In such state, it is difficult for the viewer U to simultaneously obtain the information expressed by the subtitles and the information presented by other manners, such as the video. In this viewing state, the normal images Im1-1, Im1-2 are reduced as shown in FIG. 23 and set as the important information images Im2, and by placing the important information images Im2 in the respective subtitle display areas Ar2, it becomes possible for the viewer U to simultaneously view the subtitles and the images displayed on the screens. That is, it becomes possible to simultaneously obtain the information presented as the subtitles and the information presented as the video.

Figure 24:
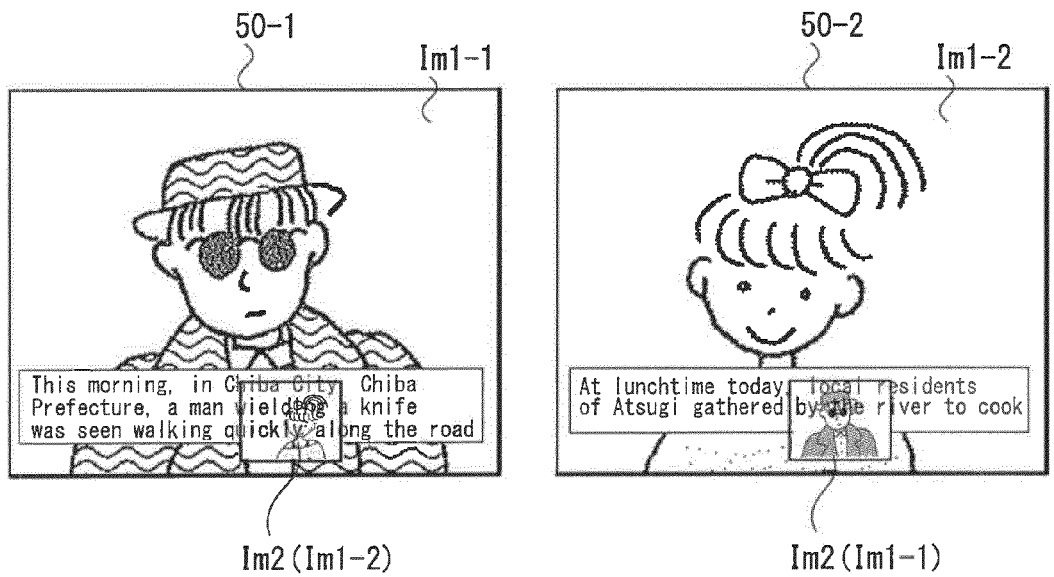
FIG. 24 is a schematic diagram showing further another example of presentation by a plurality of display units according to an embodiment of the present invention.

Also, as shown in FIG. 24, an image being displayed on a display unit 50-1 or 50-2 disposed adjacently may be presented as the important information image Im2. As shown in FIG. 24, an image of the girl displayed on the adjacent display unit 50-2 is superimposed as the important information image Im2 on the display unit 50-1 displaying an image of a man and an image of the man displayed on the adjacent display unit 50-1 is superimposed as the important information image Im2 on the display unit 50-2 displaying an image of the girl.

In this case, in the display video generating unit 40-1 of the information presentation apparatus 100B shown in FIG. 22, the important information image generating unit 44 (not shown in FIG. 22) reduces the video shown on the display unit 50-2 to generate the important information image Im2. The image combining unit 45 (not shown) superimposes the important information image Im2 that has been generated based on the video outputted to the display unit 50-2 onto the normal image Im1-1 outputted to the display unit 50-1 to generate a display image and outputs the display image to the display unit 50-1.

Also, in the display video generating unit 40-2 that generates the display image outputted to the display unit 50-2, the important information image generating unit 44 reduces the video displayed on the display unit 50-1 to generate the important information image Im2. The image combining unit 45 superimposes the important information image Im2 that has been generated based on the video outputted to the display unit 50-1 onto the normal image Im1-2 outputted to the display unit 50-2 to generate the display image and outputs the display image to the display unit 50-2.

Since a reduced image of the image displayed on the adjacent screen is displayed on the subtitle display area Ar2 by carrying out such processing, the viewer U can simultaneously view the image being displayed on the adjacent screen while reading the subtitles. By doing so, even if information with a content that is of a great interest to the viewer U is being presented on the other screen that the viewer U is not currently viewing, it may still be possible for the viewer U to immediately obtain such information. That is, information that is thought to be important to the viewer U can be obtained without being missed by the viewer U.

Note that although an example where two display units 50-1 and 50-2 are provided has been given in the present embodiment, it is also possible to use three or more units, or to display images in the same way as described above in a plurality of display areas provided on a single display screen.

When information is presented using two or more display units 50, audio may be simultaneously outputted from a plurality of the display units 50, or audio relating to the images being displayed on only one of the screens may be outputted. For example, one screen that is being viewed by the viewer U may be specified based on a detection result of the line-of-sight position detecting unit 70 and only audio relating to the images being presented on such screen may be outputted. Alternatively, the display unit 50 to output audio may be selected by the viewer U. As another alternative, only video and subtitles may be presented without audio being outputted.

Also, although an example where the subtitle image C is generated based on subtitle information included as metadata in a video signal is given in the embodiment described above, according to another example, captions that have been superimposed on a video signal may be directly displayed. In such case, it may be necessary to newly provide a device for detecting the position (present position) in a caption that corresponds to the present spoken content in the video.

Figure 25:
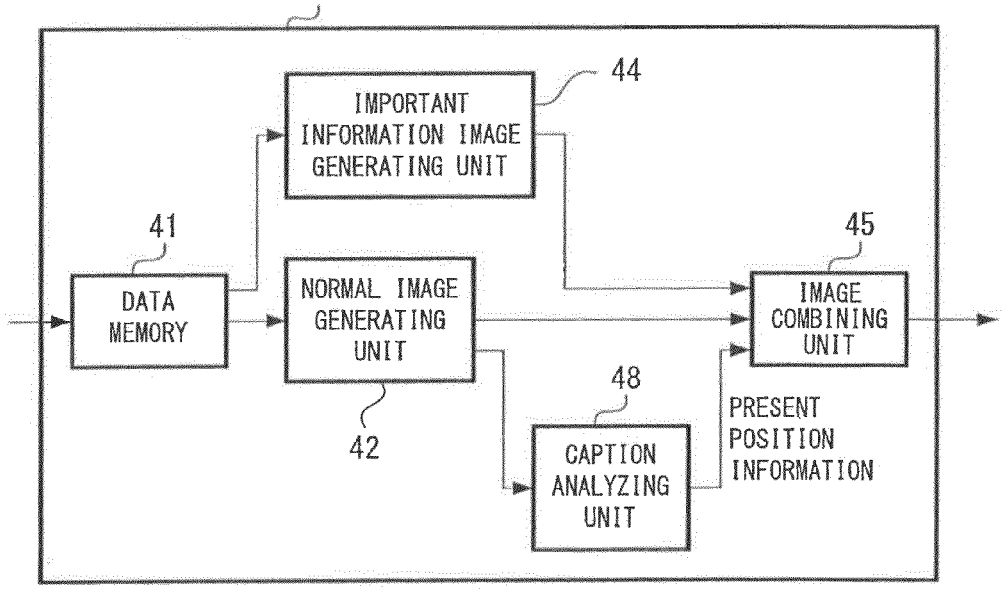
FIG. 25 is a block diagram showing another example of the internal configuration of a display video generating unit according to an embodiment of the present invention.

FIG. 25 shows an example configuration of a display video generating unit 40C in a case where captions are used as subtitle information. In FIG. 25, parts that are the same as in FIG. 3 or in FIG. 17 have been assigned the same reference numerals and description thereof is omitted. The display video generating unit 40C shown in FIG. 25 includes a caption analyzing unit 48 that extracts a caption part from the normal image Im1 outputted from the normal image generating unit 42 and calculates present position information for the subtitles.

Figure 26:
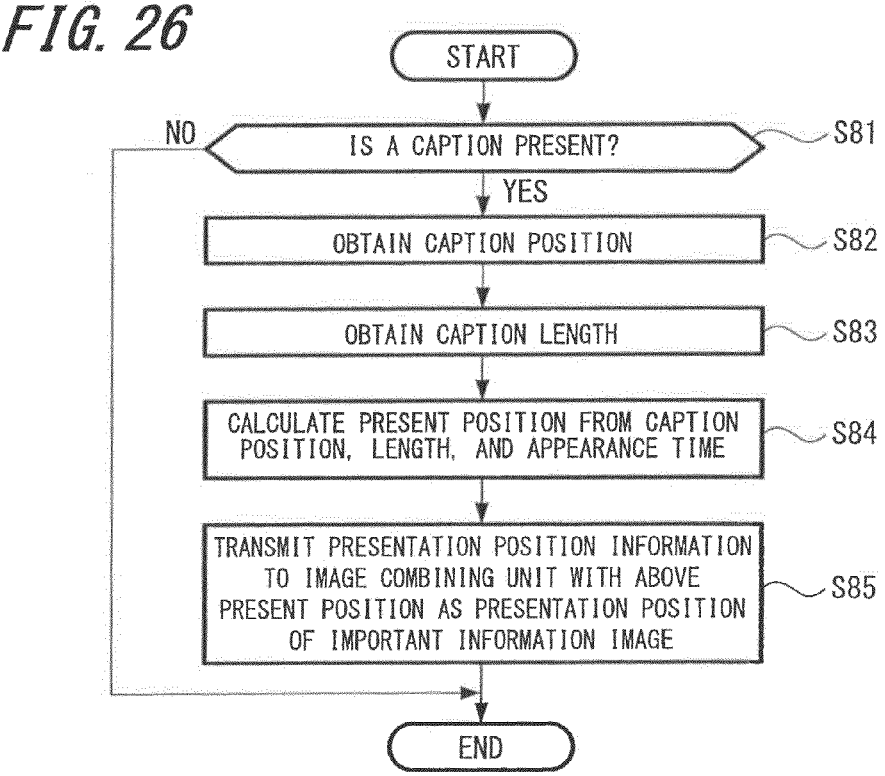
FIG. 26 is a flowchart showing another example of processing by a caption analyzing unit according to an embodiment of the present invention.

FIG. 26 shows an example of processing by the caption analyzing unit 48. The caption analyzing unit 48 first determines whether a caption is included in the normal image Im1 outputted from the normal image generating unit 42 (step S81) and when a caption is included, obtains the coordinates (position) of the caption on the screen (step S82).

Next, the caption length is obtained (step S83) and the present position in the subtitles is calculated from the obtained caption position, the caption length, and information on the time at which the caption appears on the screen (step S84). Subsequently, a position above the calculated present position is outputted to the image combining unit 45 as a presentation position for the important information image Im2 (step S85). In step S81, in the case where the presence of a caption was not confirmed, processing by the caption analyzing unit 48 is terminated.

When captions included in a video signal are used as subtitles, it is not possible to carry out processing such as superimposing the characters of the subtitles onto the important information image Im2 in the background of the caption. For this reason, processing that sets the placement position of the important information image Im2 at a position above the caption is carried out so that the subtitles displayed as the caption are not hidden by the important information image Im2. Note that the placement position of the important information image Im2 is not limited to above the caption, and the important information image Im2 may be placed in a peripheral position, such as below the caption.

Figure 27:
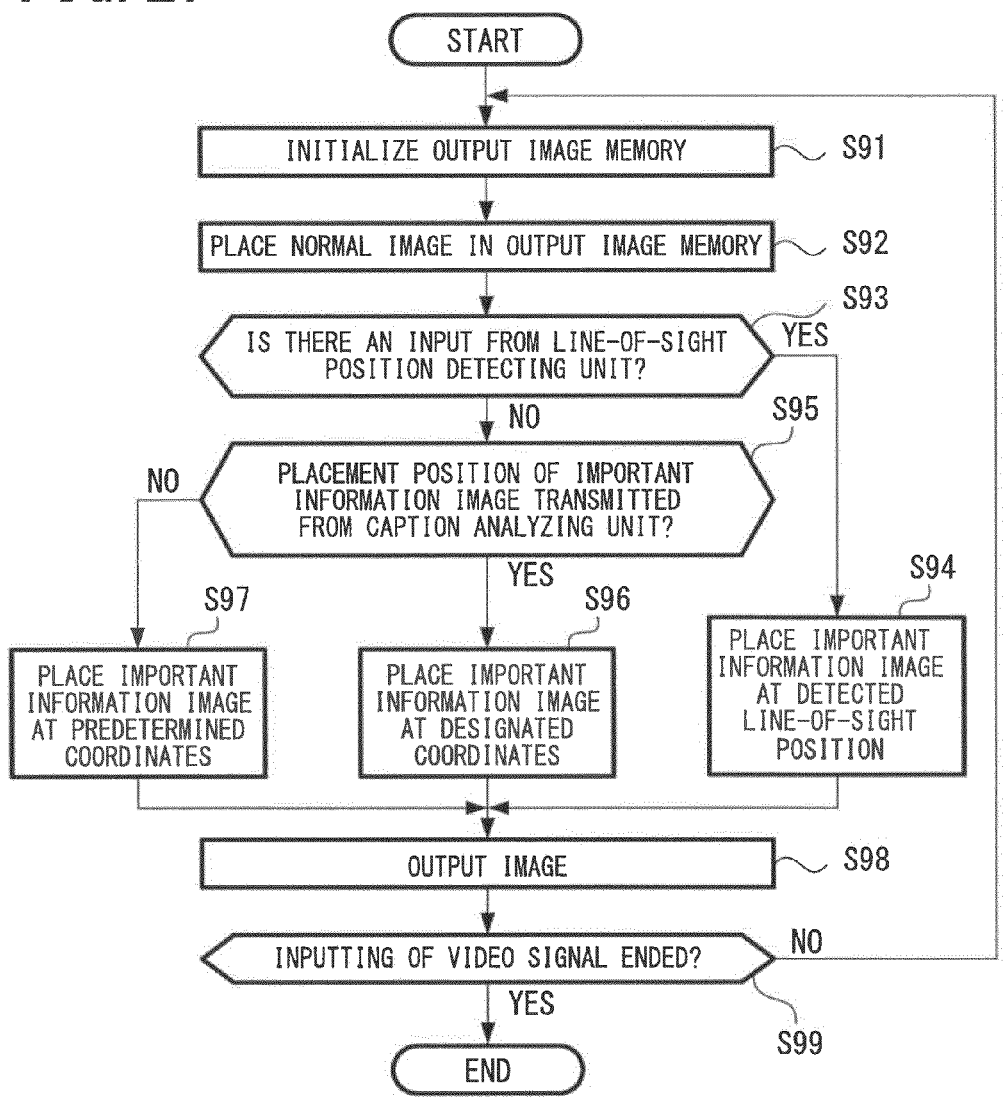
FIG. 27 is a flowchart showing another example of processing by an image combining unit according to an embodiment of the present invention.

FIG. 27 is a flowchart showing an example of processing by the image combining unit 45 in the display video generating unit 40C shown in FIG. 25. The image combining unit 45 first initializes the output image memory 45a (see FIG. 3) (step S91) and places the normal image Im1 outputted from the normal image generating unit 42 (see FIG. 3) in the output image memory 45a (step S92).

Next, it is determined whether the gaze position P has been inputted from the line-of-sight position detecting unit 70 (see FIG. 2) (step S93), and when input from the line-of-sight position detecting unit 70 has been detected, the important information image Im2 is placed at the inputted gaze position P (step S94). When an input from the line-of-sight position detecting unit 70 is not confirmed, it is next determined whether the placement position of the important information image Im2 has been transmitted from the caption analyzing unit 48 (step S95).

When the placement position of the important information image Im2 has been transmitted from the caption analyzing unit 48, the image combining unit 45 places the important information image Im2 at the coordinates shown as the placement position (step S96). When the placement position has not been transmitted from the caption analyzing unit 48, the important information image Im2 is placed at predetermined coordinates set in advance (step S97).

Subsequently, the display image generated in this way is outputted to the display unit 50 (step S98). Here, it is determined whether inputting of the video signal into the image combining unit 45 has ended (step S99), and if the inputting of the video signal is continuing, the processing returns to step S91 and the processing is continued. If the inputting of the video signal has ended, the processing is terminated.

Figure 28:
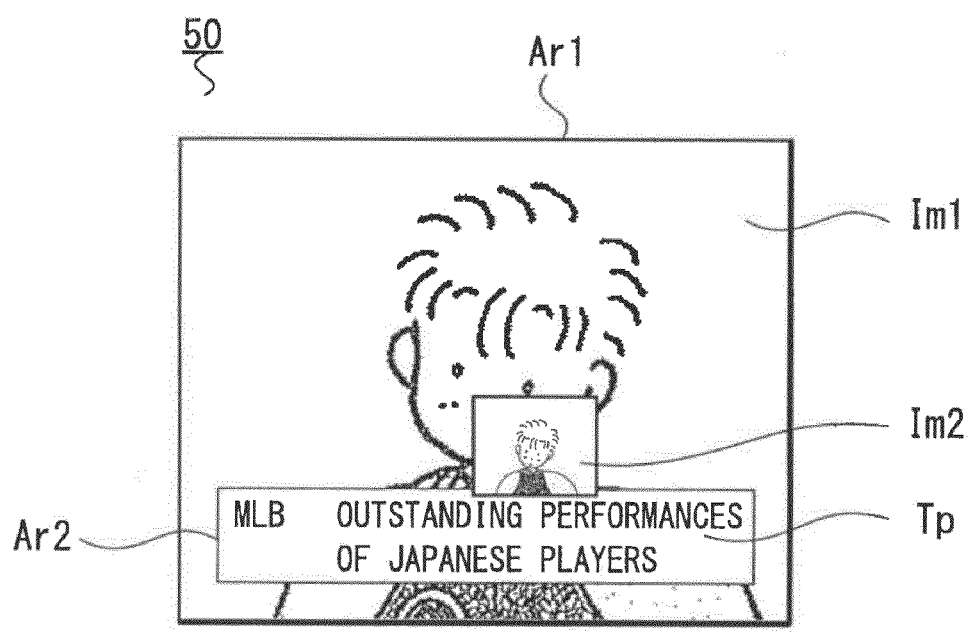
FIG. 28 is a schematic diagram showing another example display according to an embodiment of the present invention.

FIG. 28 shows an example display in a case where the processing described above has been carried out. On the display unit 50 shown in FIG. 28, a subtitle display area Ar2 that displays the caption Tp is provided in a lower part of the image display area Ar1 displaying the normal image Im1, and a reduced image of the normal image Im1 is disposed as the important information image Im2 above the subtitle display area Ar2.

When a caption Tp is used as subtitles, by placing the important information image Im2 at a position that does not overlap the subtitle display area Ar2 where the caption Tp is displayed, both the caption as the subtitles and the important information image Im2 can be placed at positions that are within the field of vision of the viewer U.

Note that although the embodiment described above uses the present position information outputted from the subtitle image generating unit 43 and the gaze position P outputted from the line-of-sight position detecting unit 70 as the parameters for determining the placement position of the important information image Im2, it is also possible to use only one of such positions. That is, according to another example, a configuration that does not use a line-of-sight position detecting unit 70, a configuration that uses the line-of-sight position detecting unit 70 but where the subtitle image generating unit 43 does not carry out a present position calculating process, and the like can be used.

Also, although an example configuration where the information presentation apparatus 100 includes the display unit 50 has been described in the above embodiment, the present invention can also be applied to a configuration that does not include the display unit 50. That is, a configuration where the generated display image is outputted to an external display apparatus may be used.

The present application contains subject matter related to that disclosed in Japanese Priority Patent Application JP 2008-099566 filed in the Japanese Patent Office on Apr. 7, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information presentation apparatus comprising:
   a video signal inputting unit into which a video signal is inputted;
   a first image generating unit configured to generate an image using the video signal inputted from the video signal inputting unit;
   a second image generating unit configured to generate a small image with a display size smaller than a display size of the image generated by the first image generating unit;
   a subtitle image generating unit configured to calculate a predetermined display position within a subtitle image having subtitle information of spoken content corresponding to the image contained in the video signal; and
   an image combining unit configured to combine the small image generated by the second image generating unit with the image generated by the first image generating unit by superimposing the small image at the predetermined display position within a subtitle display area where the subtitle image is displayed within the image generated by the first image generating unit.

2. The information presentation apparatus according to claim 1, wherein the image combining unit places the small image generated by the second image generating unit in a background of subtitles displayed in the subtitle display area.

3. The information presentation apparatus according to claim 1, further comprising:
a line-of-sight position detecting unit configured to detect a position of a line of sight of a viewer and output the detected position of the line of sight,
wherein the image combining unit places the small image generated by the second image generating unit at the position of the line of sight outputted by the line-of-sight position detecting unit as the present position corresponding to a spoken content in the image based on the video signal.

4. The information presentation apparatus according to claim 1, wherein the image combining unit places the small image generated by the second image generating unit between lines in the subtitles displayed in the subtitle display area.

5. The information presentation apparatus according to claim 1, wherein the second image generating unit generates the small image by reducing an image based on the video signal.

6. The information presentation apparatus according to claim 1, wherein the second image generating unit generates the small image that relates to a planned content to be presented a predetermined period after the present time in a media content provided with the video signal.

7. The information presentation apparatus according to claim 1, wherein the second image generating unit generates the small image by reducing an image being displayed in a subscreen area in which an image is superimposed on an image based on the video signal.

8. The information presentation apparatus according to claim 1, wherein the second image generating unit generates the small image based on an input signal from an external device connected to the information presentation apparatus.

9. The information presentation apparatus according to claim 1, wherein the second image generating unit generates a small image of an image based on a different video signal from the video signal.

10. The information presentation apparatus according to claim 1, wherein
the second image generating unit generates a small image of an image being displayed by a second display unit that differs from a first display unit displaying the image generated by the first image generating unit, and
the image combining unit combines the small image of the image being displayed on the second display unit with the image generated by the first image generating unit.

11. The information presentation apparatus according to claim 1, wherein the subtitle image includes past spoken content and future spoken content of content contained in the video signal.

12. The information presentation apparatus according to claim 11, wherein the past spoken content and future spoken content are displayed in different colors.

13. The information presentation apparatus according to claim 11, wherein the subtitle image contains a start time identifying when the subtitle image is to be displayed and an end time identifying when to end the display of the subtitle image.

14. The information presentation apparatus according to claim 13, wherein the predetermined display position in a subtitle display area and the color of the past spoke content and future spoken content are determined based on the present time, the start time, the end time and the number of characters in the subtitle image.

15. The information presentation apparatus according to claim 13, wherein, based on the present time, start time and end time, the small image indicates an amount of time until predetermined information is displayed in the image.

16. The information presentation apparatus according to claim 15, wherein the small image indicates a topic relating to the predetermined information.

17. The information presentation method comprising the steps of:
obtaining a video signal;
generating an image using the video signal;
generating a small image with a display size smaller than a display size of the generated image; and
calculating a predetermined display position within a subtitle image having subtitle information of spoken content corresponding to the image contained in the video signal; and
combining the generated small image with the generated image based on the video signal by superimposing the small image at the predetermined display position within a subtitle display area where the subtitle image is displayed within the generated image based on the video signal.

* * * * *